(12) United States Patent
Grigoriadis et al.

(10) Patent No.: US 7,721,200 B2
(45) Date of Patent: *May 18, 2010

(54) AUTOMATIC AUTHORING AND PUBLISHING SYSTEM

(75) Inventors: Irene Grigoriadis, Malibu, CA (US); Victor A. Ramirez, North Hollywood, CA (US)

(73) Assignee: OmegaBlue, Inc., Santa Monica, CA (US)

( * ) Notice: Subject to any disclaimer, the term of this patent is extended or adjusted under 35 U.S.C. 154(b) by 848 days.

This patent is subject to a terminal disclaimer.

(21) Appl. No.: 11/553,437

(22) Filed: Oct. 26, 2006

(65) Prior Publication Data

US 2007/0101259 A1 May 3, 2007

Related U.S. Application Data

(63) Continuation-in-part of application No. 11/379,769, filed on Apr. 21, 2006.

(60) Provisional application No. 60/674,157, filed on Apr. 21, 2005.

(51) Int. Cl.
*G06F 17/00* (2006.01)
(52) U.S. Cl. .................................. 715/243; 715/255
(58) Field of Classification Search .............. 715/243, 715/255
See application file for complete search history.

(56) References Cited

U.S. PATENT DOCUMENTS

| | | | |
|---|---|---|---|
| 5,133,051 A | 7/1992 | Handley | |
| 5,140,676 A | 8/1992 | Langelaan | |
| 5,146,404 A * | 9/1992 | Calloway et al. | 705/1 |
| 5,228,121 A | 7/1993 | Fontaine et al. | |
| 5,890,177 A * | 3/1999 | Moody et al. | 715/210 |
| 6,052,514 A | 4/2000 | Gill et al. | |
| 6,167,409 A * | 12/2000 | DeRose et al. | 715/234 |
| 6,233,592 B1 | 5/2001 | Schnelle et al. | |
| 6,343,302 B1 | 1/2002 | Graham | |
| 6,377,956 B1 * | 4/2002 | Hsu et al. | 707/104.1 |
| 7,278,094 B1 * | 10/2007 | Dreyer et al. | 715/234 |
| 7,337,399 B2 * | 2/2008 | Jensen et al. | 715/255 |

(Continued)

OTHER PUBLICATIONS

Office Action for U.S. Appl. No. 11/379,769 with Notice of References Cited, dated Jun. 23, 2008, total 12 pages.

(Continued)

*Primary Examiner*—Rachna S Desai
(74) *Attorney, Agent, or Firm*—Connolly Bove Lodge & Hutz LLP

(57) ABSTRACT

The invention relates to a system and method for automatically producing documents that incorporate one or more data elements. A guided/structured software environment is provided that assists users in creating manuals by defining the appropriate content for each manual section, content rules and relationships, and tasks to be performed for each type of manual entry. Manual content is stored as structured data elements, rather than pages of sentences, to more efficiently generate, revise, and store the content of a manual. A storage database is provided for retrieving and storing predefined templates, documents and individual data elements to produce a final manual. Manuals are created by combining various data elements. An instant preview interface permits a user to quickly view what revisions will look like in a final document prior to actually publishing the manual. A published manual is compiled by assembling the stored data elements and into a document.

20 Claims, 14 Drawing Sheets

U.S. PATENT DOCUMENTS

| | | | |
|---|---|---|---|
| 2002/0046245 A1 | 4/2002 | Hillar et al. | |
| 2002/0156816 A1* | 10/2002 | Kantrowitz et al. | 707/530 |
| 2003/0149935 A1 | 8/2003 | Takizawa et al. | |
| 2003/0149940 A1 | 8/2003 | Fordyce et al. | |
| 2004/0049742 A1* | 3/2004 | Yokoyama et al. | 715/530 |
| 2004/0243921 A1 | 12/2004 | Carr et al. | |
| 2005/0022104 A1 | 1/2005 | Wrenholt et al. | |
| 2005/0022118 A1 | 1/2005 | Wefers et al. | |
| 2005/0050442 A1* | 3/2005 | Pope et al. | 715/500 |
| 2005/0204047 A1* | 9/2005 | Mitchell et al. | 709/228 |
| 2006/0010172 A1* | 1/2006 | Grigoriadis et al. | 707/200 |
| 2006/0155700 A1 | 7/2006 | Dejean et al. | |
| 2006/0271603 A1* | 11/2006 | Mathias | 707/201 |

OTHER PUBLICATIONS

ProtoType Industries, Inc. Press Release Sep. 18, 2002.

ProtoType Industries, Inc. Press Release Sep. 2, 2003.

ProtoType Industries, Inc. Web Page Feb. 4, 2005.

Office Action for related U.S. Appl. No. 11/379,769 with Notice of References Cited, dated Apr. 22, 2009, total 12 pages.

Office Action for related U.S. Appl. No. 11/379,769 with Notice of References Cited, dated Sep. 15, 2009 total 14 pages.

Office Action for related U.S. Appl. No. 11/677,461 with Notice of References Cited, dated Oct. 5, 2009 total 31 pages.

* cited by examiner

AUTOMATIC AUTHORING AND PUBLISHING SYSTEM

CLAIM OF PRIORITY UNDER 35 U.S.C. §120

The present Application for Patent is a continuation-in-part of U.S. patent application Ser. No. 11/379,769, entitled "Automatic Authoring and Publishing System", filed Apr. 21, 2006, which claims the benefit of U.S. Provisional Patent Application No. 60/674,157, entitled "Documentation Preparation System," filed Apr. 21, 2005, assigned to the assignee hereof, and are hereby expressly incorporated by reference herein.

FIELD

The present invention relates to authoring and publishing software tools. More particularly, at least one embodiment provides an assisted authoring and publishing software tool that guides users in authoring and publishing manuals with structured templates having defined content areas, electronic library (data pools) of permissible content, structured data storage, and synthetic text generation.

BACKGROUND

During a production process of aircraft and other products, alterations or modifications to the aircraft product must be reflected in the corresponding technical, maintenance, and/or end-user documentation or manuals. For instance, as the audio/video system in a commercial aircraft is upgraded or changed the corresponding manuals have to be modified according to industry rules or regulations. Since an aircraft fleet may include aircraft having different combinations of systems or upgrades, different sets of manuals or instructions are often needed to support all aircraft in the fleet. Maintaining and generating the various document revisions leads to a tedious, time consuming, and potentially error-prone process.

The commercial aviation industry has determined that exchange of technical publications in a digital format provides substantial benefits compared to the traditional mediums of paper and microfilm. The industry has chosen the Standard Generalized Mark-up Language (SGML) [ISO 8879:1986] to exchange technical data currently published in book form. Technical illustrations are exchanged using the Computer Graphics Metafile (CGM) [ISO/IEC 8632:1999] for vector data and/or the CCITT Group 4 compression standard for raster data.

Existing documentation techniques typically employ intricate versioning schemes, esoteric document "languages" and large amounts of storage to hold all the different permutations of the documentation. U.S. Pat. No. 6,377,956 discloses a process in which documents are manually altered or revised, while older document versions are added to an ever growing database of complete documents before finally assembling the final document. The older document versions are maintained with all associated graphics, text and diagrams related to each document. However, with this approach, the size of the database eventually becomes very large and, consequently, processing of the documents slows down. U.S. Pat. No. 6,377,956 also relies on manual, unassisted editing of existing documents that typically requires specialized knowledge of the subject matter by the author, editor and others reviewing the document. That is, the person editing such documents would need to have specific knowledge about the product and the product's history to be able to ascertain whether the associated graphics, text and diagrams in the documentation are correct. A quality assurance reviewer or editor familiar with the technology, steps, or processes described in the documentation would need to review the final document for reliability. An author or reviewer may be required to re-learn an entire area of knowledge to update older documents. In complex technical systems, the possibilities for errors are proportional to the amount of knowledge required by the authors and reviewers. The potential for error may result in safety violations or other dangerous situations. Further, the author-reviewer-rewrite cycle is time consuming and inefficient.

U.S. Patent Publication 2005/0022118 describes using a template where all the required elements that form the output must be maintained in exactly the same location otherwise the template is unable to recreate the document accurately. This technique is rigid, inflexible, and in most cases requires the author to make the template out of a document description language as described in U.S. Pat. No. 6,377,956. This requires the author to have extra knowledge about the structural requirements of the book/manual and how the selected templates may affect the final output. For example, in the airline industry the Federal Aviation Administration (FAA) and the Federal Transit Administration (FTA) require documentation to meet specific standards. Authors constantly review the formatting requirements to comply with changing governmental regulations. Further, U.S. Patent Publication 2005/0022118 only allows the structure of the book to be shown, and does not preview the final product for the author to see the effect of any changes. Thus, the author has to wait until the content is published and then make alterations in a repetitive cycle until the document is satisfactory. Any changes made during the review process starts the cycle over again wasting time and delaying production of the documentation required.

Thus, for the reasons discussed above, prior art document production and storage techniques are inadequate to generate, structure, and store multiple altered versions of a document. Furthermore, the ability to check and track changes made is slow and cumbersome due to the number of document comparisons that must be made. Therefore, there is a need for a system and method that assist and guide authors in creating highly structured documents that are automatically assembled, formatted, and reproduced to accurately reflect all the elements of the system with minimal knowledge required of the author. A further need exists for a system and method for updating and maintaining such documents to reflect the specific elements actually used in the project.

SUMMARY

Digital data can be used in different fields across multiple industries. Benefits of using digital publications are expected for all users of the publications, from the producer to the end user. Various aspects of the present invention are aimed at exploiting these benefits.

One embodiment of the present invention assists users in automatically generating content and publishing technical books, manuals, and/or documents for large-scale, complex products and services for building, maintaining, repairing, servicing, and/or retrofitting products (e.g., aircraft, automobiles, electronic appliances, etc.).

One feature provides a guided or structured software environment that assists users in creating books, manuals, and/or documents by creating document definitions having data structures and defined content for each section, content rules and relationships, and tasks to be performed for each type of document entry. Predefined document definitions and data structures are used to facilitate the creation of data elements and compile a final book, manual, or document.

Another feature provides for storing the manual content as structured data elements, rather than as sentences or paragraphs, to more efficiently generate, revise, and store the content of a book, manual, or document. That is, rather than storing content as complete pages of text (e.g., sentences, paragraphs), tables, and/or graphics, the present invention stores the content as distinct data elements in a database. This also allows different manuals to be compiled using some of the same data elements, thereby saving storage space. Moreover, this approach to storage of content permits a single data element to be modified to propagate that modification to all other manuals referencing that data element.

Yet another novel feature provides an instant preview mode that permits an author to quickly view what edited content will look like in a final document prior to actually publishing the manual. A publishing engine publishes the manual by assembling the stored data elements and compiling them into a single document.

A book, manual or document may be presented as a structured document and converted into a translation document that can be output in a user selected format. While several of the examples described herein relate to aircraft service or maintenance books or manuals, it should be understood that the various features of the present invention may be implemented in a wide array of document creation processes for various purposes, products, and/or systems besides aircraft.

One implementation provides a method for authoring and publishing a document. A document definition includes a plurality of predefined data elements arranged in a tree-like data structure. Such document definition defines the data type for content, rules governing such content, a structure for such content, and relationships with other data types. One or more of the predefined data elements are edited using content-specific selection (pull-down) menus and stored as selected data elements in a relational database to store a customized document. Text is automatically synthesized from the selected data elements by compiling the selected data elements according to the structure defined by the document definition to generate the customized document. An effectivity feature in the customized document is used to track the predefined data element and/or selected data element across multiple other documents. The plurality of predefined data elements may be selected from the group consisting of text, quantity, descriptions, procedures, and graphical metadata. The step of editing one or more of the predefined data elements may include performing tasks pre-associated with the predefined data elements. The predefined data elements or selected data elements may be cross-referenced to one or more other documents. The content-specific selection menus may be dynamically generated based on a defined content type of the document definition. The customized document may be previewed in real-time prior to publishing. The customized document may be published by performing the steps of: (1) converting the customized document into an extensible markup language document; (2) forwarding the extensible markup language document to an extensible stylesheet transform; and/or (3) outputting the extensible markup language document from the extensible stylesheet transform as a published document. An internet-based change request may be received to effect a change to the published document. This method may also be implemented on hardware, software, or a combination thereof.

DETAILED DESCRIPTION

Figure 1:
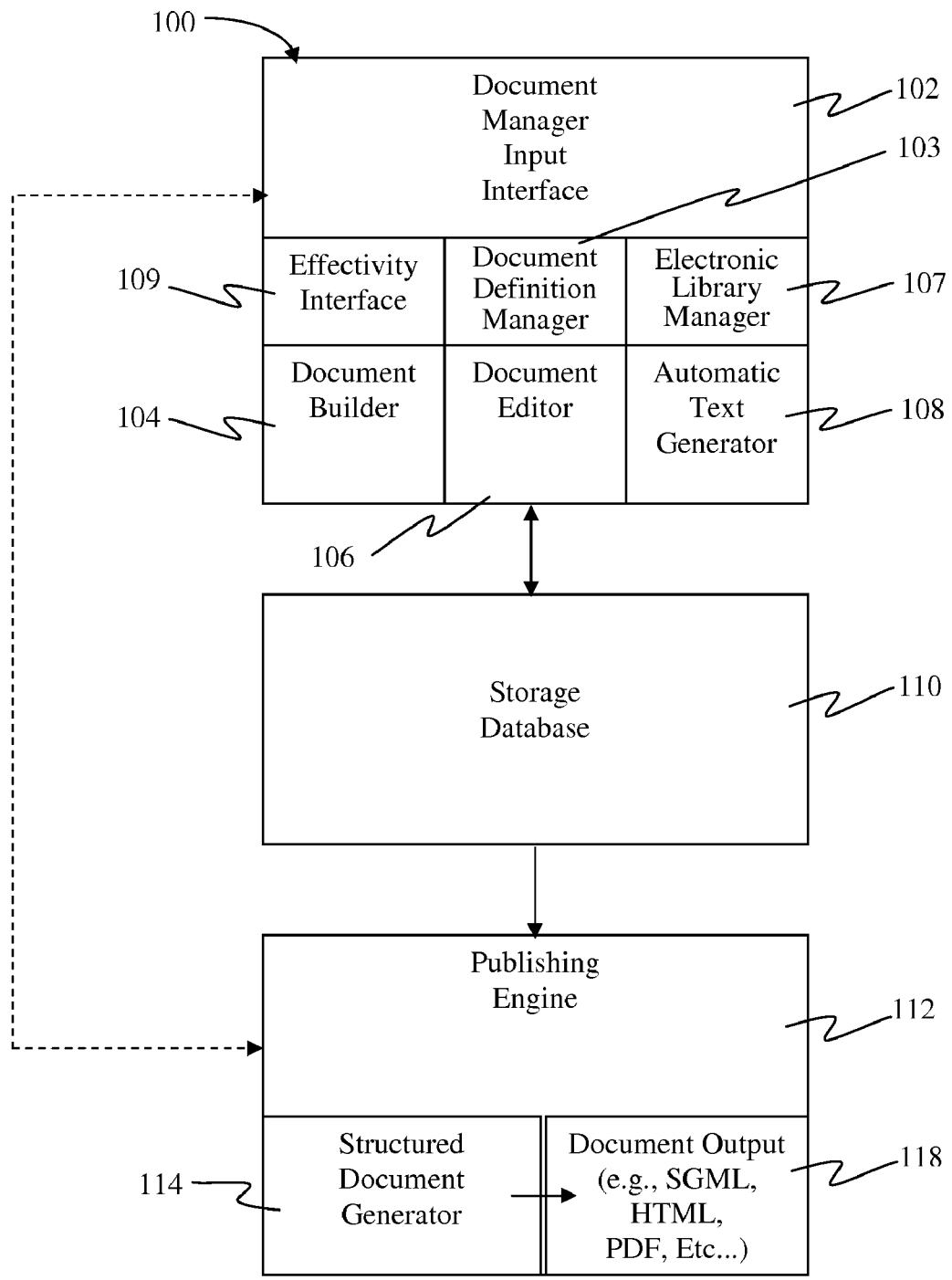
FIG. 1 is a block diagram illustrating an automatic authoring and publishing system according to one embodiment of the invention.

Methods and devices that implement various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure where the element first appears. The following description is provided to enable a person skilled in the art to make and use the invention and sets forth the best modes contemplated by the inventor, but does not limit the variations available.

In the following description, certain terminology is used to describe certain features of one or more embodiments of the invention. The term "document" refers to any form or display that is readable including manuals, manuscripts, web pages, printable documents or other form capable of being read. The term "storage device" refers to any device capable of storing information, including hard drives, dynamic random access memory (DRAM). The term "data element" refers to any quantum of data packaged as a single item. The term "data unit" refers to a collection of data elements and/or data units that comprise a logical section. The term "storage database" includes any mechanism that provides (i.e., stores and/or transmits) information in a form readable by a machine (e.g., a computer). The term "effectivity" denotes the subset of qualities which the book content is provided to maintain, e.g., product part, repair tasks, etc. The term "storage medium" may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, and various other mediums capable of storing, containing or carrying instruction(s) and/or data.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Various embodiments provide a system, method and/or device for an automatic authoring and publishing system. One embodiment of the present invention assists users in automatically generating content and publishing technical manuals for large-scale, complex products and services for building, maintaining, servicing, and/or retrofitting aircraft.

One feature provides a guided or structured software environment that assists users in creating manuals or documents by defining the appropriate data structures and content for each manual section, content rules and relationships, and tasks to be performed for each type of manual entry. Predefined document definitions and data structures are used to facilitate the creation of data elements and compile a final book, manual, and/or document.

Another feature provides for storing the manual content as structured data elements, rather than as sentences or paragraphs, to more efficiently generate, revise, and store the content of a manual. That is, rather than storing content as complete pages of text (e.g., sentences, paragraphs), tables, and/or graphics, the present invention stores the content as distinct data elements in a database. This also allows different books, manuals, and/or documents to be compiled using some of the same data elements, thereby saving storage space. Moreover, this approach to storage of content permits a single data element to be modified to propagate that modification to all other books, manuals, and/or documents referencing that data element.

Yet another novel feature provides an instant preview mode that permits an author to quickly view what revisions will look like in a final document prior to actually publishing the manual. A publishing engine publishes the manual by assembling the stored data elements and compiling them into a single document.

Another feature uses the structured content to automatically generate audio and/or animation. For example, since manuals typically use a limited number of words and/or phrases to describe procedures and/or parts, an text to audio converter and/or animation may be used to generate video and/or audio from the manuals or books.

A compiled document may be converted into a structured document (e.g., XML, etc) and forwarded to a publishing engine (e.g., Extensible Stylesheet Language Transformation (XSLT), etc.) where it is output in a user selected format. While several of the examples described herein relate to product service or maintenance manuals, it should be understood that the various features of the present invention may be implemented in a wide array of document creation processes for various purposes, products, and/or systems.

General System

FIG. 1 is a block diagram illustrating an automatic authoring and publishing system 100 according to one embodiment of the invention. The automatic authoring and publishing system 100 includes a document manager input interface 102, a storage database 110, and a publishing engine 112. In various implementation, these components of the authoring and publishing system 100 may be separate or integrated software modules that operate to guide a user in authoring a manual, defining data structure and allowable content, storing content as distinct data elements, providing a quick preview of content prior to full publication, and tracking changes from one revision to the next.

The document manager input interface 102 may include a document definition manager 103, document builder 104, a paragraph editor 106, electronic library manager 107, effectivity interface 109, and an automatic text generator 108.

The document definition manager 103 enables a user to build a document definition. Unlike a templates that merely define sections and/or layouts for a document, a document definition specifies data types, structures, rules and relationships for permissible content as well as electronic libraries associated with the document definition. The document definition manager 103 allows a user to manage defined data structures, create templates, and manage task-oriented function codes. The data structures may be defined by the user or a regulatory body, such as the Air Transport Association (ATA) in the case of aircraft systems, for example.

Figure 2:
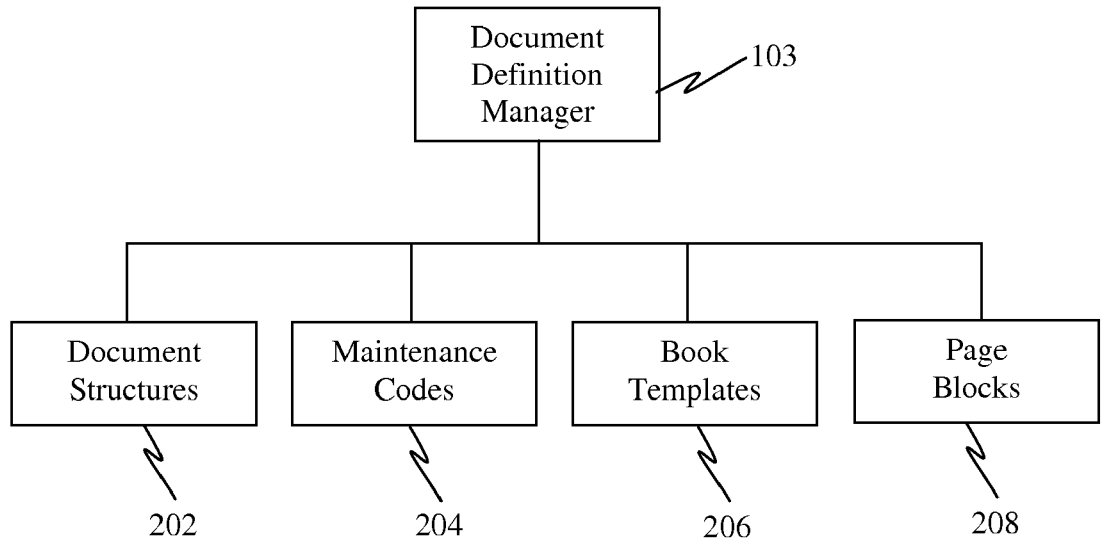
FIG. 2 illustrates one example of components associated with a document definition manager.

FIG. 2 illustrates one example of components associated with a document definition manager 103. The document manager 103 includes document structures 202 that define data types, arrangements (e.g., data relationships, rules, etc.), and other characteristics of a book, manual, and/or document or sections thereof. For example, maintenance codes 204 (e.g., codes specific to a repair or maintenance function of a product or component) are also maintained and/or defined through the document definition manager 103. This allows ready access to these codes when a user is creating a manual or document. Book templates 206, defining the sections and/or organization of particular types of books, manuals, and/or documents are also maintained and/or defined through the document definition manager 103. Page blocks 208, defining font types and/or other page formatting information for a document definition are also available through the document definition manager 103.

The document definition manager 103 may load a set of default data structures 202 that the user may customize or the user may create new structures to use on a manual. In this manner, a document definition specified by a particular data structure, specific set of rules and content applicable to the selected data structures, and a predefined corresponding electronic library that provides the relevant parts, components, and/or tasks associated with a particular product to which the book, manual, and/or document pertains.

Figure 3:
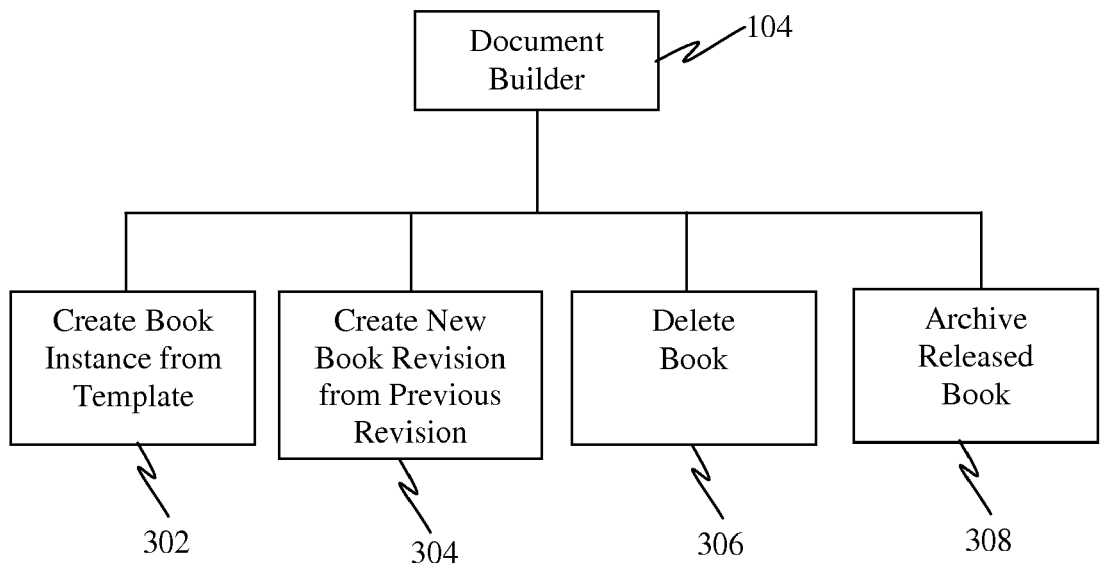
FIG. 3 illustrates one example of components associated with a builder module.

The builder module 104 allows a user to create a new instance (e.g., book, manual, document, etc.) from one or more document definitions and/or create a revised instance based on a previous version of that instance. The builder module also archives a book, manual, or document by removing it from the storage database 110 in order to keep the amount of data in database 110 minimized. FIG. 3 illustrates one example of components associated with a builder module 104. The document builder 104 is configured to create a book instance from a template 302, create a new book revision from a previous book revision 304, delete a previously built book from the database 306, and archive a released book 308.

Having defined a particular document definition or previous revision of a book, manual, or document, the user may select and edit one or more parts and/or sections.

As previously noted, a document definition may define the type of permissible content for a particular field, section, paragraph or page of the book, manual, and/or document. For instance, one or more tasks for each defined manual field or section may be defined from a predefined set of tasks provided by the document manager input interface 102. The selected manual sections and tasks may be organized as tree-like data structures that are identified by the document definition. In one example, these tasks may define the general steps needed to accomplish a particular installation, removal, and/or maintenance of a particular book, manual, and/or document field or section.

Figure 4:
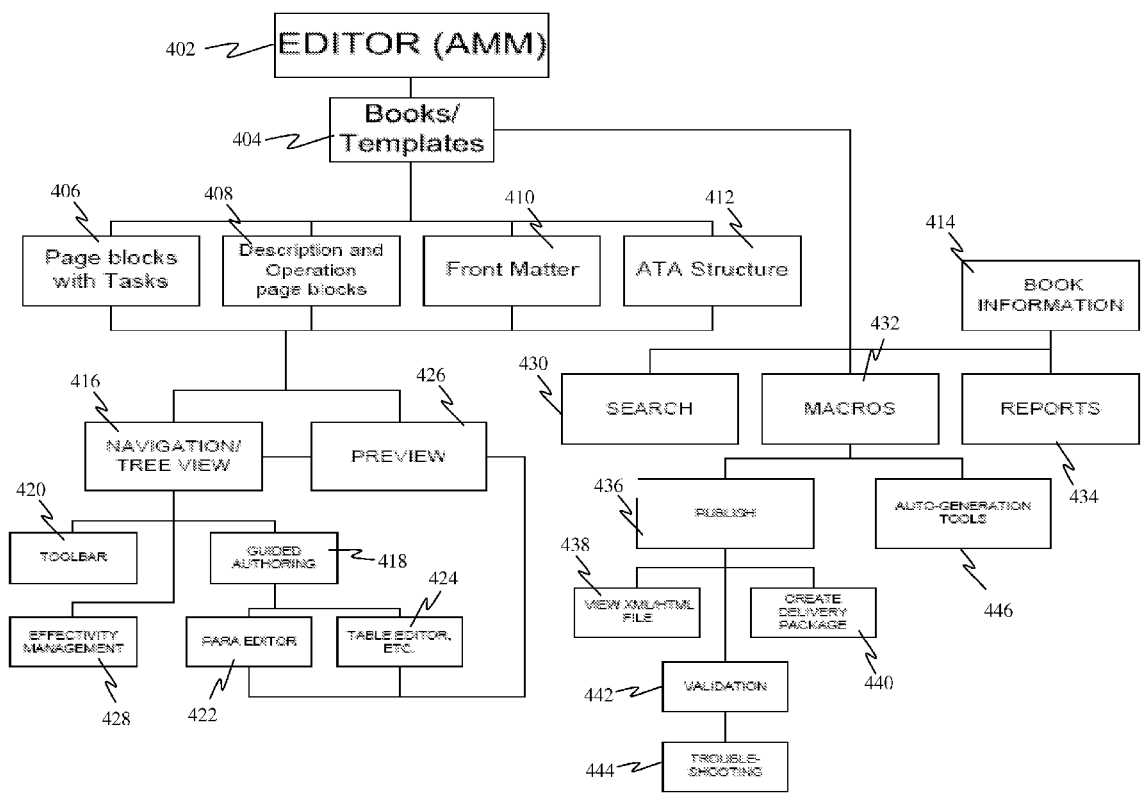
FIG. 4 is a block diagram illustrating an automatic authoring and publishing editor according to one arrangement.

FIG. 4 is a block diagram illustrating an automatic authoring and publishing editor 402 according to one arrangement. The editor 402 serves to create and edit books, documents, and/or templates 404 that are defined by document definitions including page blocks with tasks 406, description and operation page blocks 408, front matter (e.g., generic content for each section) 410, and a specification structure 412. A navigation component 416 provides guided authoring 418 of book content via content selection toolbars 420, a paragraph editor 422, and a table editor 424. An effectivity manager 428 also cross-references particular tasks or system components with products. A preview component 426 allows a user to preview a section or paragraph being edited as it would appear when published.

Additionally, a search component 430 enables a user to search a book, document, and/or template. A reports component 434 is used to generate reports for one or more books while a book information component 414 provides book-specific information (e.g., author, creation date, revision, etc.) A set of macros 432 may be used to publish a book by validating 442 its content, and troubleshooting 444 any publishing/validation problems. The publishing output may be in a XML/HTML file 438 and/or other form out output 440 (e.g., compact disc, etc.). Additionally, the macros 432 may provide other auto-generation tools 446 that generate audio and/or video output from the published books and/or documents.

Figure 5:
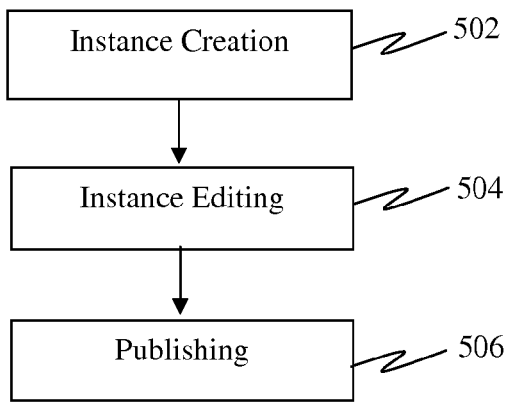
FIG. 5 illustrates logical components for an automatic authoring and publishing system according to one example.

FIG. 5 illustrates logical components for an automatic authoring and publishing system according to one example. These components may implement one or more of the features or steps described in FIGS. 1, 2, 3, 4 and 7. This example illustrates instance creation 502 which includes the creation of a document definition. Instance editing 504 includes instance editing which includes generating a book, manual, or document from the predefined document definition. Publishing 506 generates an output file from the edited instance.

Figure 6:
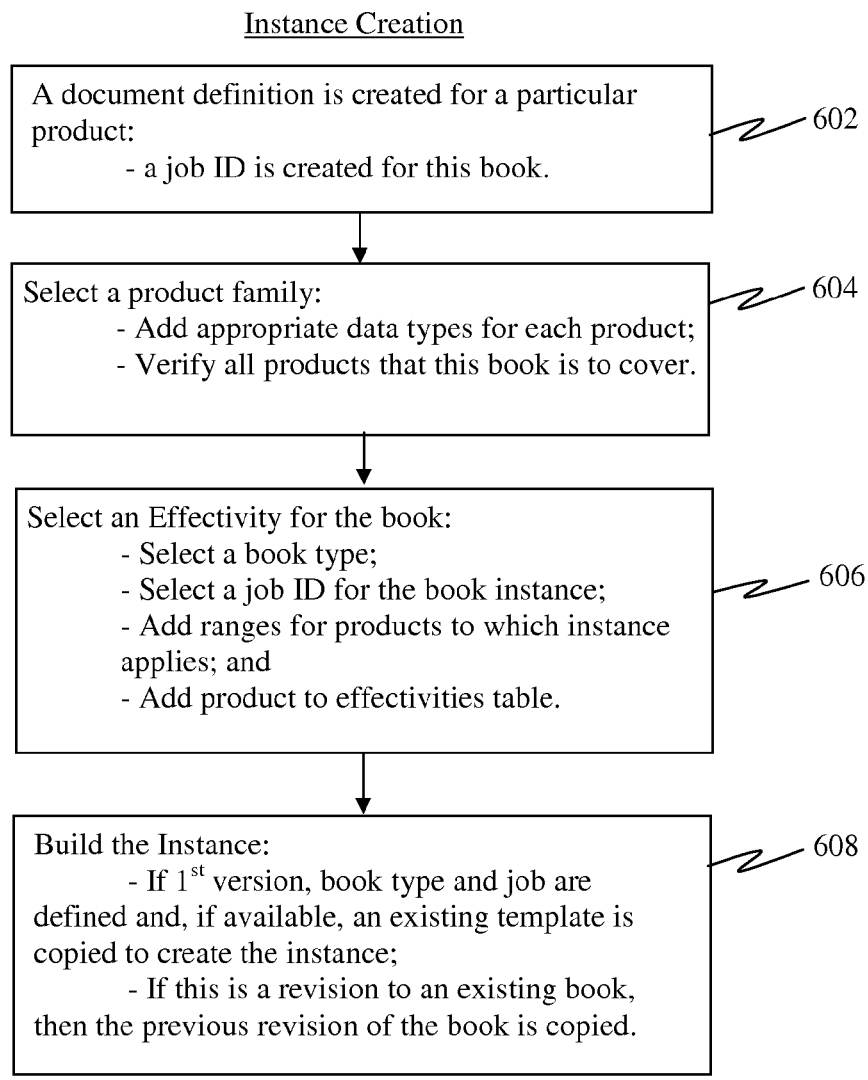
FIG. 6 illustrates a method for instance creation according to one example.

FIG. 6 illustrates a method for instance creation according to one example. A document definition file is created for a particular product 602. A job ID may also be associated with such instance. A product family is selected for such instance 604, and appropriate data types are added for each product. All products for the book are also verified. An effectivity for the book is selected 606. The instance is then built 608 either from a current document definition or from a previous revision of the book.

Figure 7:
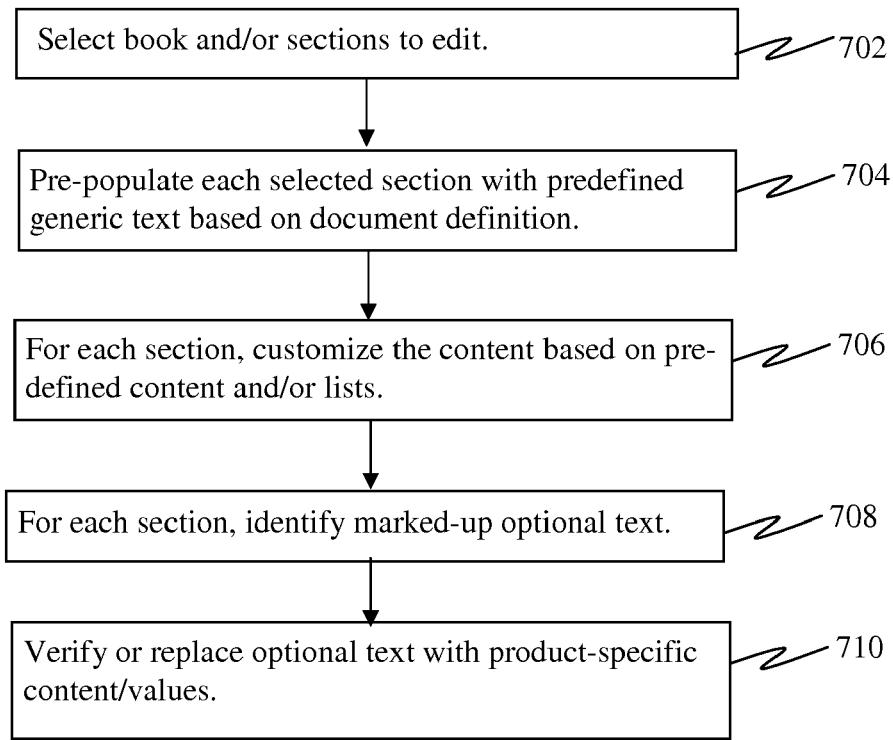
FIG. 7 illustrates a method for editing an instance according to one example.

FIG. 7 illustrates a method for editing an instance according to one example. A book and/or sections are selected for editing 702. Each selected section are pre-populated with predefined generic text (e.g., cover page, service bulletin lists, introduction, glossary, legal notice, etc.) 704. For each section, the content is customized based on pre-defined content and/or lists 706. For each section, marked-up optional text is identified 708. The optional text is verified or replaced with product-specific content/values.

Figure 8:
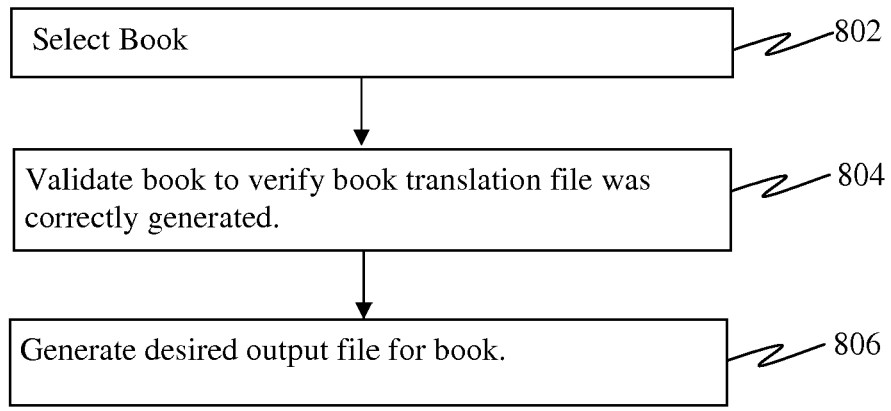
FIG. 8 illustrates a method for publishing a book according to one example.

FIG. 8 illustrates a method for publishing a book according to one example. A previously created book is selected 802. The book is validated 804, and if it passes validation, an output file in a desired format is generated for the book 806.

Document Editor

Once a document template has been defined based on a document definition, it then exist in a database that permits an author to then fill-in the document template according to data structure, rules, and conditions imposed by the editor which can be configured by using a configuration table or file. Once the document has been filled by an author and validated, it can then become part of a new book, manual, and/or document revision.

Figure 9:
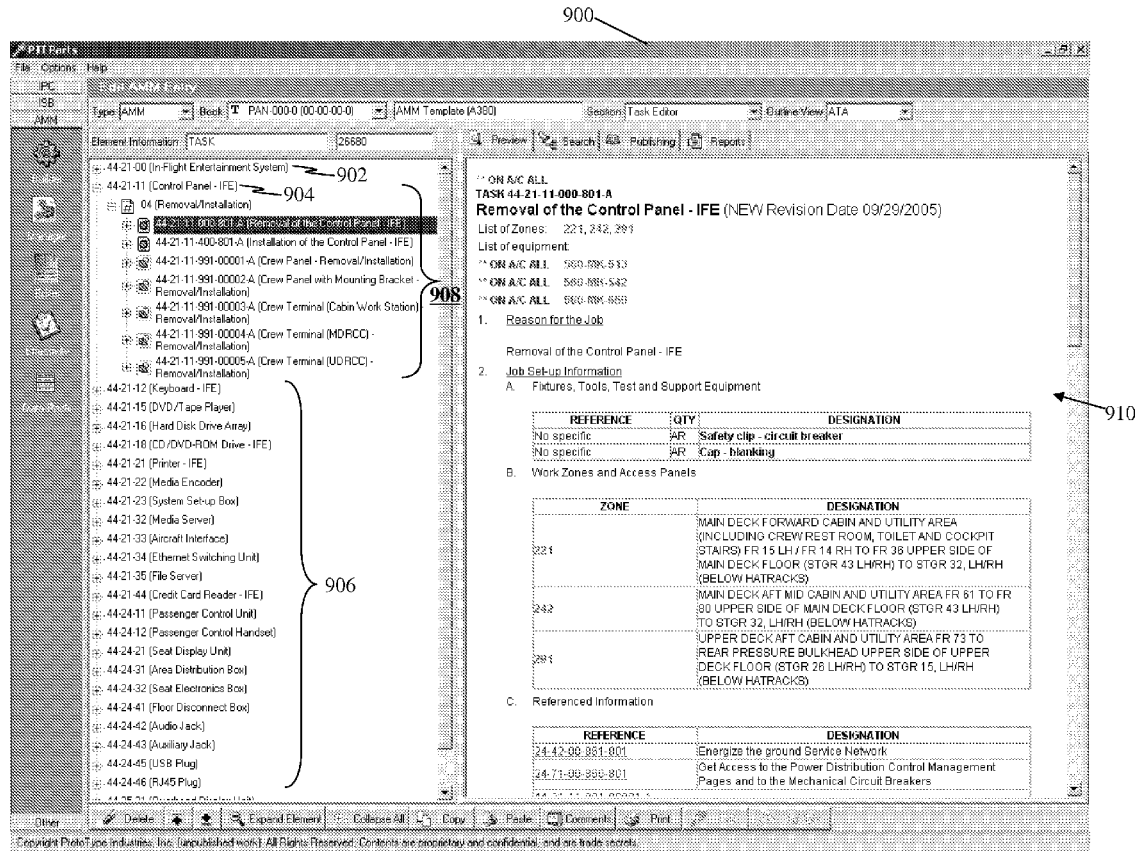
FIG. 9 illustrates a document editor interface that an author can use to open a document template and add content to the document template guided by the structure and rules of the document template to generate a manual.

The document editor module 106 allows an author to finalize the content of a document template to generate a book or manual. The document editor module 106 allows a user to add, delete, and modify the content and structure of a selected book (manual or document). The document editor module 106 may include a dynamically generated menu system based on the content structure, rules, and/or conditions specified in the document template being used. Such menu system may be selected based on a book type, book number, and section of the book. That is, the document editor module 106 retrieves the data structure, rules, and conditions defined by the document template (for the book type, book number, and section) and generates one or more menus that guide the author and facilitates generating the manual's contents (e.g., removal, maintenance, installation, instructions or steps). For example, FIG. 9 illustrates a document editor interface 900 that an author can use to open a document template and add content to the document template guided by the structure and rules of the document template to generate a manual. For a defined system (e.g., the In-Flight Entertainment (IFE) System 902), various components 904 and 906 (e.g., Control Panel IFE, Keyboard IFE, DVD/Tape Player, etc.) may be defined in a tree-like structure. For each component 904 and 906, a document definition may define one or more tasks and sub-tasks 908. Thus, an author is guided by the data structure of the document to the predefined components and tasks. As a result, the author need not be an expert in the system or components but merely follow the defined data structure and rules imposed by the document definition. The tree-like structure of system components and tasks may be predefined or imposed by a standard. A preview pane 910 also shows the content of the selected task page.

Effectivity

One aspect of the invention introduces the concept of "effectivity" in which particular product-supporting data is associated with one or more products and this association is propagated to documents cross referenced or hyperlinked to the particular tasks or system components. Many systems and processes currently in place used for controlling how product data content is linked to the physical product were designed for human interpretation. Effectivity problems become more apparent with the increased use of computers. Computer applications require more consistency than humans to interpret complex data relationships correctly. In addition, as advancements in computing occur, applicability concepts facilitate information management with improved levels of capability.

Effectivity parameters are used to distinguish the applicability of technical information pertaining to an individual product, part, or a component in its configuration at the time of application. Electronic information storage and presentation mechanisms require a precise definition of terms, constructs, format and allowed values to facilitate accurate matching of data to a physical product. The applicability process refers to how unique product identification is established and how data content is consistently applied to those unique products. This process is fundamental to managing configuration of the product and the technical information about the product.

The present invention provides a framework for satisfying specific requirements for computer processing as well as output of the various digital documents and page based manuals. Presentation specifications relate to how the data is shown in the output media either for paper, digital documents or on-line access.

Figure 10:
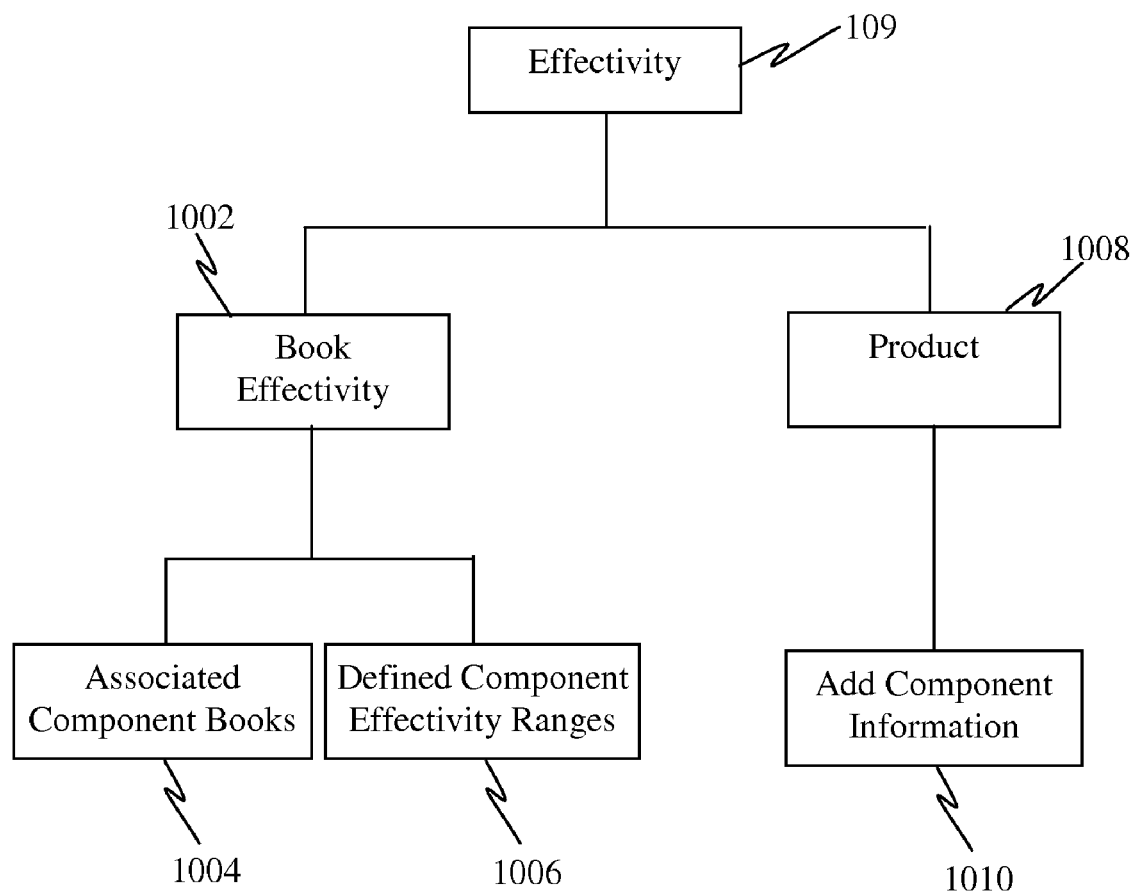
FIG. 10 illustrates components of an effectivity interface provided to enable a user to establish effectivity associations or relationships.

FIG. 10 illustrates components of an effectivity interface 109 provided to enable a user to establish effectivity associations or relationships. Once associated, the particular task or system component is propagated to all other related documents that contain the same product. A book effectivity 1002 may be defined to include associated components for a book 1004 (e.g., parts or components associated with a particular model of product) and defined component effectivity ranges 1006 (which define the products associated with each particular component). Additionally, the effectivity of particular products 1008 may also be defined, allowing users to add component information 1010 on a per product basis.

The concept of effectivity guarantees the propagation of application-specific or model specific information throughout a manual so that all applications or models covered by a particular manual are accurately supported. For example, if bolts used in affixing an overhead compartment to the fuselage of an aircraft are replaced by an improved fastener, the data element representing the bolt is replaced with a new individual element representing the new fastener. The system propagates the effectivity of this change to the documents that contain the bolt and automatically updates the documents. The notion of a product family may be used to gather products sharing the same properties and associate them with product-supporting data corresponding to said properties. These families of products may be defined in accordance with the customers. Overlaps in effectivity statements are not allowed for variant data structures or elements. Thus, one or more data structures or elements are associated with a particular product. This effectivity can be used to make sure that all associated elements for a particular product have been included in a particular manual.

Automatic Text Generator

In one embodiment, the document manager input interface 102 may also incorporate an automatic text generator 108 that allows the deconstruction of the syntax of textual data elements from the tree-like data structure of a document template. The textual data elements are syntactically joined with the appropriate linguistic rules prior to outputting a document or manual. The automatic text generator 108 can generate one or more manual tasks, such as assembly instructions, disassembly instructions, test procedures, cleaning procedures, repair procedures, inspection procedures, operation procedures, or other required text, within the automatic text generator's 108 lexical capabilities. One implementation of the automatic text generator 108 is disclosed in U.S. patent application Ser. No. 10/887,162 a System and Method for Generating Text by Grigoriadis et al., which is hereby incorporated by reference in its entirety.

Data Storage

Another feature provides an electronic library manager 107 that allows a user to manage standard data structure types. The electronic library manager 107 allows a user to add, delete, and/or modify data that is standard in particular data structures, thus customizing them for particular applications and making them readily available to be inserted into the document by a user, thereby avoiding error and inconsistencies.

The storage database 110 is a repository for document data elements that can include text, graphics, parts and other items that can be reused in other documents or are unique to specific documents. In another embodiment, the data elements comprise diagrams, procedures for operation, maintenance, and cleaning of the unit or a list of tools required to perform a task. In yet another embodiment, the data elements comprise price, quantity, availability and reordering data.

Figure 11:
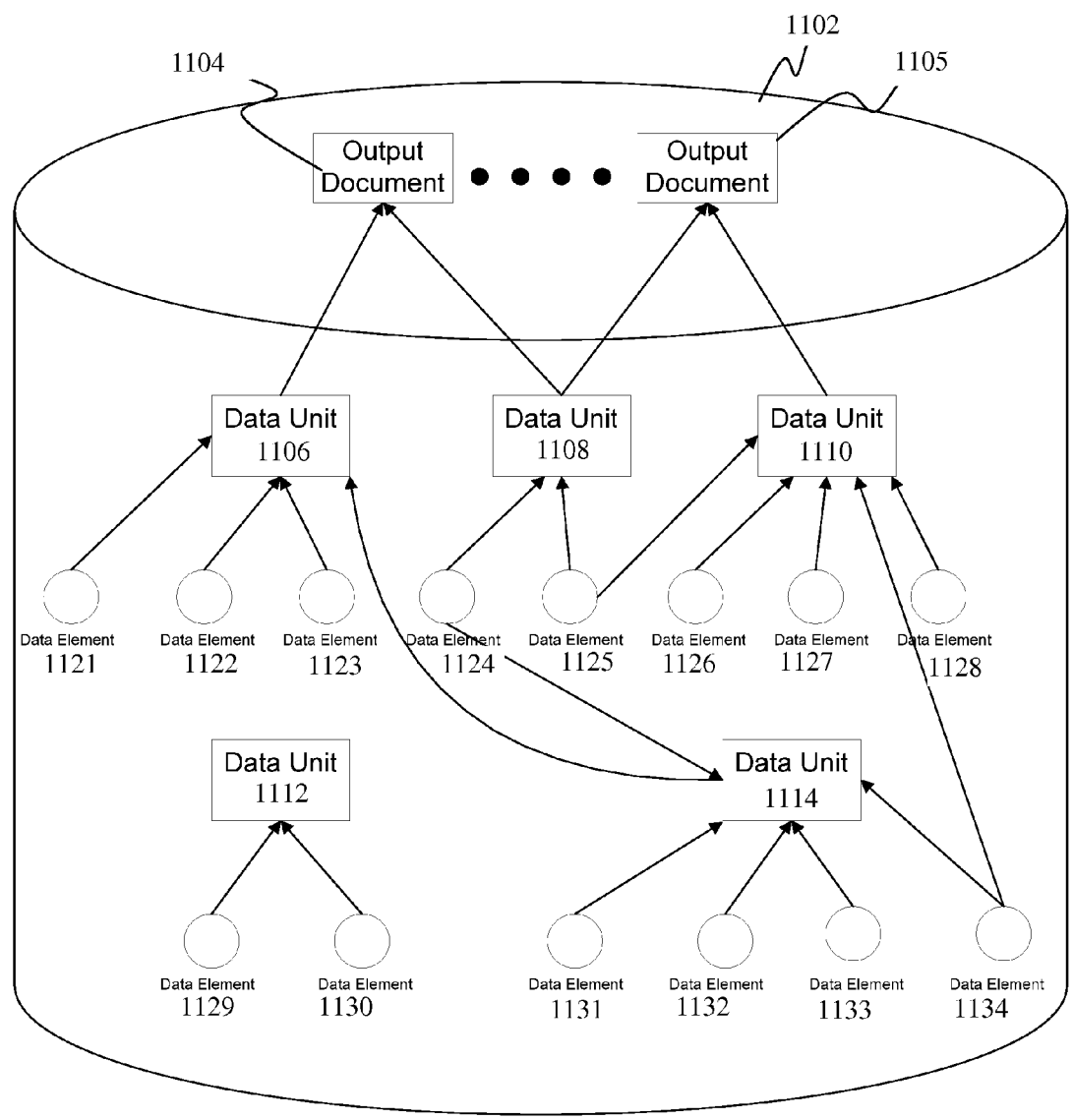
FIG. 11 is a block diagram illustrating the data structure of a relational storage database according to one embodiment of the invention.

FIG. 11 is a block diagram illustrating the data structure of a relational storage database 1102 according to one embodiment of the invention. Output documents 1104 and 1105 are compiled from data elements 1121-1134 that define content in a bottom up approach. Data units 1106-1110 may be composed of one or more data elements 1121-1134 or data units 1112 and 1114. A single data element 1124 may be used in multiple data units 1108 and 1114. Additionally, a first data unit 1114 may be used as part of a second data unit 1106. The links between data elements 1121-1134 are dynamically created as data is structured and the data elements 1121-1134 can be used in multiple different output documents 1104 and 1105 or manuals. A modification to a data element 1124 or a data unit 1114 automatically updates the output documents 1104 and 1105 that have the data element 1124, or the data unit 1114 contained within them, obviating the need to manually or individually update the output documents 1104 and 1105. Data elements 1114-1134 may contain manual or document content, content attributes, rules and/or conditions as distinct components of a data structure or unit. For example data element 1122 may contain a chart or graphic while data element 1123 contains a maintenance procedure.

One feature provides a revision history of data elements 1121-1134 and/or output documents 1104 and 1105 so that prior versions of the output documents 1104-1105 can be reproduced. In another embodiment, data elements 1121-1134 contain security levels that restrict user access to modify the data elements 1121-1134.

In some embodiments, a document editor is configured to place a data element 1121-1134 in a tree-like structure. The user can modify the tree-like structure, add content to the elements in the tree-like structure, and/or display a preview of a modification to the tree-like structure. For example, a user can move a document data element 1121-1134 from an existing tree-like structure to another tree-like structure (i.e. cut and paste the document data element 1121-1134), or copy a part or the entire tree-like structure into a new or existing document. User modifications to the tree-like structure operations need not affect the document data elements 1121-1134, only the structure or relationship of the document data elements within the tree-like structures. In one embodiment, the document data elements 1121-1134 are selected from the group consisting of one or more text, quantity, descriptions, procedures and graphical metadata.

In one embodiment, the publishing engine for producing output from the system is configured to gather document data elements 1121-1134 and place them in a predetermined form according, for example, to a document template. The publishing engine may add images to the predetermined form, for example, a maintenance troubleshooting flowchart.

Document Translations

By using structured document definitions, translation of a book or manual into various languages (e.g., Japanese, German, French, Russian, Chinese, Arabic, English, etc.) is facilitated. The tagging of standard sentences such as warnings, cautions, circuit breaker lists may facilitates automatic translation. This also allows translating the text within technical illustrations.

Structured Document Generation

Figure 12:
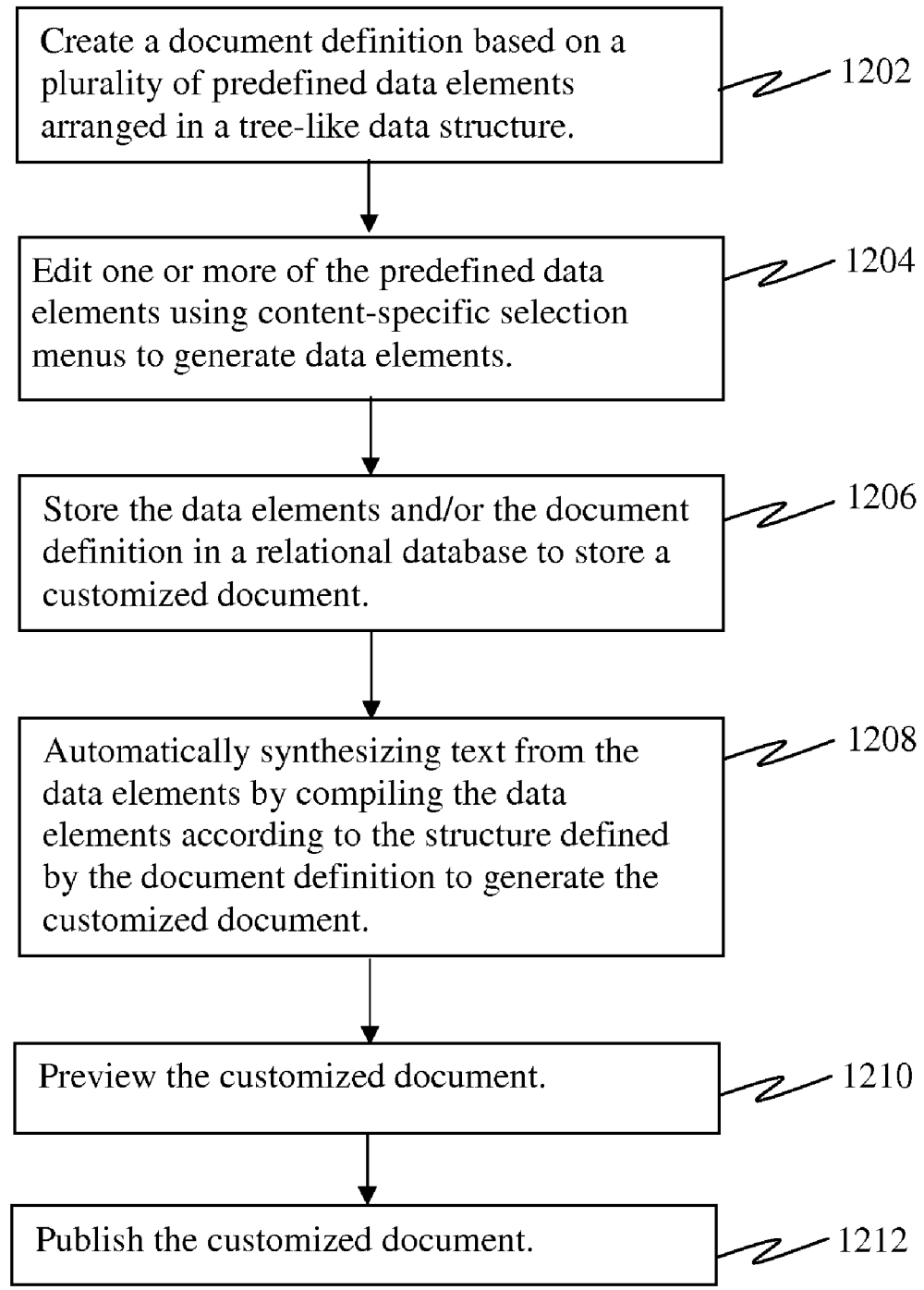
FIG. 12 illustrates a method for authoring a manual using a guided and structured document generation system according to one embodiment of the invention.

FIG. 12 illustrates a method for authoring a manual using a guided and structured document generation system according to one embodiment of the invention. A document definition is defined based on a plurality of predefined data elements arranged in a tree-like data structure 1202. One or more of the predefined data elements are edited using content-specific selection menus to generate data elements 1204. The data elements and/or the document template are stored in a relational database to store a customized document 1206. Text from the data elements is automatically synthesized by compiling the data elements according to the structure defined by the document definition to generate the customized document 1208. The customized document may be previewed 1210 prior to publishing 1212.

Publishing Engine

A publishing engine 112 is also provided comprising a structured document (e.g., XML) generator 114, and any specified final document output format 118. The publishing engine 112 operates in real-time as data is edited, added, deleted, etc. The publishing engine continuously updates the database tables when changes are made by a user, which in turn updates a cached output data file, thereby updating the document preview. In one embodiment, the publishing engine 112 uses a structured document (e.g., XML) as an intermediate step prior to publishing.

In another embodiment, the final output format 118 is based on the Standard Generalized Markup Language (SGML). SGML is an ISO standard: ISO 8879:1986 information processing language. SGML allows the writer to be focused on the structural aspects of a document and leave the visual presentation of that structure to the publishing engine 112. SGML supports the development of common retrieval systems as well as the creation of product databases. The use of common elements and structures for all documents promote the use of common software such as parsers, printing and display software using Format Output Specification Instances (FOSIs), SFQL clients and SFQL servers.

In other embodiments the document output can be in any desired output format, for example, such as HTML, PDF, XML, SGML, RTF, plain text, etc.

Figure 13:
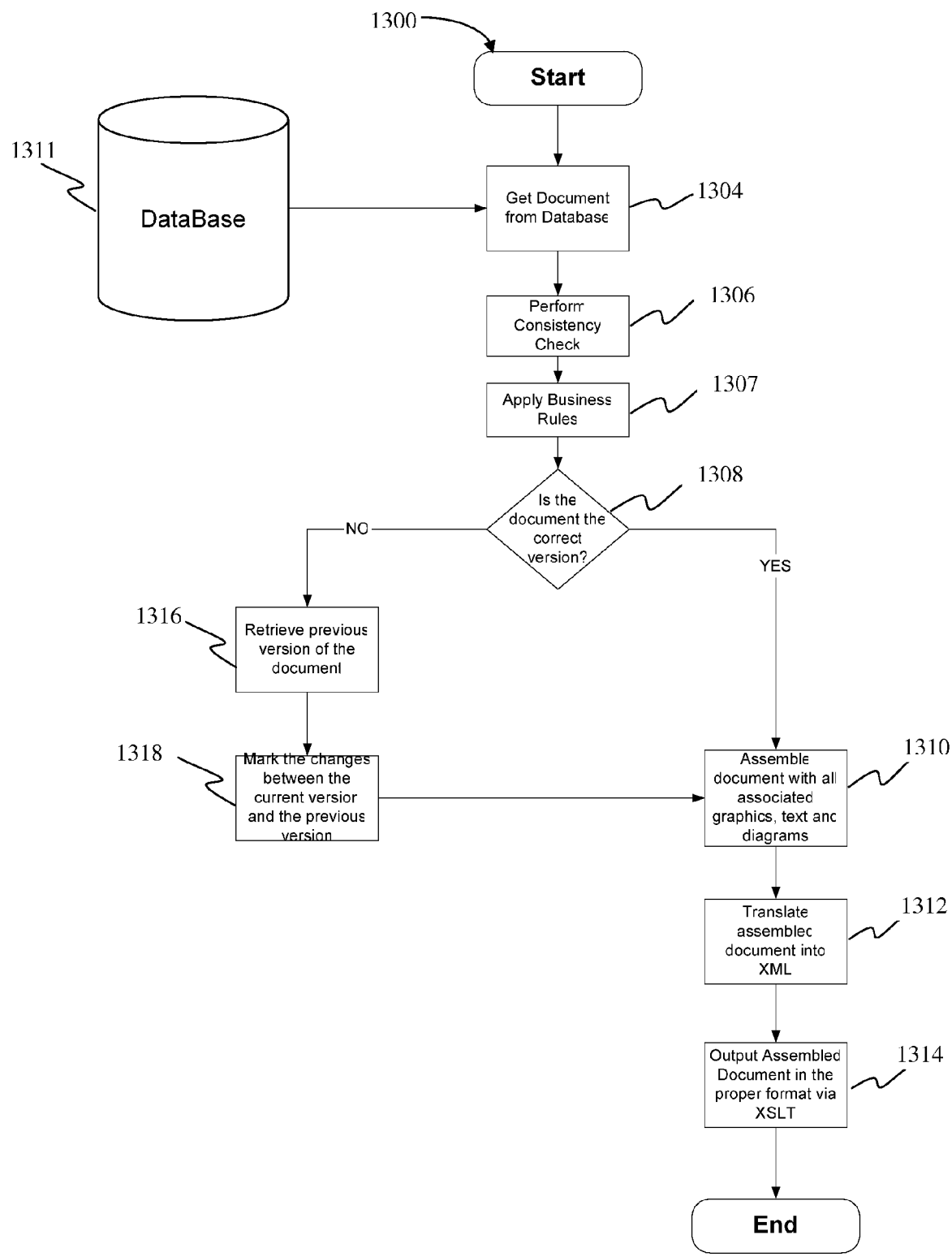
FIG. 13 illustrates a method for operating a publishing engine according to one embodiment of the invention.

FIG. 13 illustrates a method for operating a publishing engine according to one embodiment of the invention. One or more finalized documents 1304 are retrieved from the database 1311. A consistency check 1306 is performed to insure that the document has all the data elements needed or defined by the document definition. Business rules 1307 defined in the document definition are then applied. For example, if the user selects a business rule for an upgraded audio-visual system to be installed in an aircraft, the corresponding parts, technical specifications, technical manuals, maintenance manuals, etc., are incorporated into the document in place of the standard audio-visual system. The document is then checked to determine if it is the correct version 1308 to be published. If the document is not the correct version to be published, the previous version of the document is retrieved 1316 and changes between the current version and the previous version 1318 of the documents are marked. For example, when the user selects an upgraded audio-visual system for publication, the differences between the documentation with the standard audio-visual system and the upgraded audio-visual system are marked so that the upgraded system is used in the documentation in place of the standard system. The document is then assembled with all associated graphics, text and diagrams 1310, then translated into a structured document 1312, and outputted in a user selected format 1314.

Figure 14:
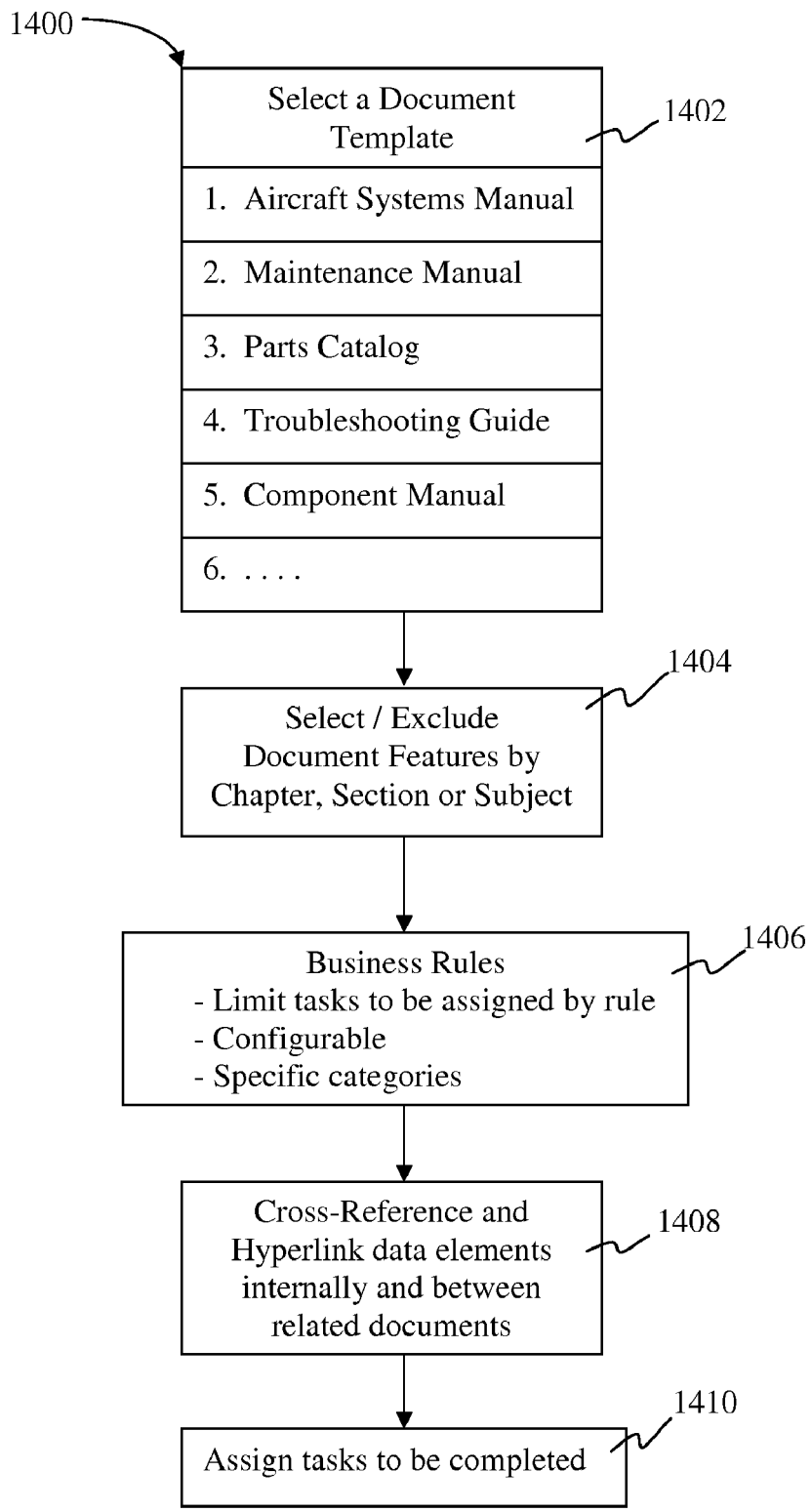
FIG. 14 illustrates a method for authoring a document using the automatic authoring and publishing system according to one embodiment of the invention.

FIG. 14 illustrates a method for authoring a document using the automatic authoring and publishing system according to one embodiment of the invention. A document template for a particular document, such as an aircraft system manual, a maintenance manual, a parts catalog, a troubleshooting guide or a component manual, is selected 1402. In other embodiments the list of available document templates can be related to the final documents to be output from the system, the government/industry standards for documents, or by client design. Document template features 1404 (i.e. charts, diagrams, procedures, text, etc.) may be selected or excluded from the document being authored by the user. These features may be selected or excluded on various levels of the document including by the chapter, section, and/or subject. Business rules 1406 may be applied to the document to limit the tasks that can be assigned to a user. The business rules 1406 may be configured by the user to adapt to the specific needs of the final document. For example, a standard business rule for adding audio capabilities to an aircraft may be modified to limit the audio to only the first class section of the aircraft. Business rules 1406 can be assigned to specific categories to facilitate their use. For example, business rules relating to the audio systems on an aircraft can be categorized under "Audio," and the food service business rules can be categorized under "Food." Various data elements may also be cross-referenced and/or hyperlinked internally and between related documents 1408. This permits storing content as structured data elements rather than as a single document. A set of tasks are then defined to be completed by an author in order to finalize or complete a document or manual. This may include customizing a document template for a particular type of product or operation. Thus, document templates and corresponding data structures are formed according to this method.

Figure 15:
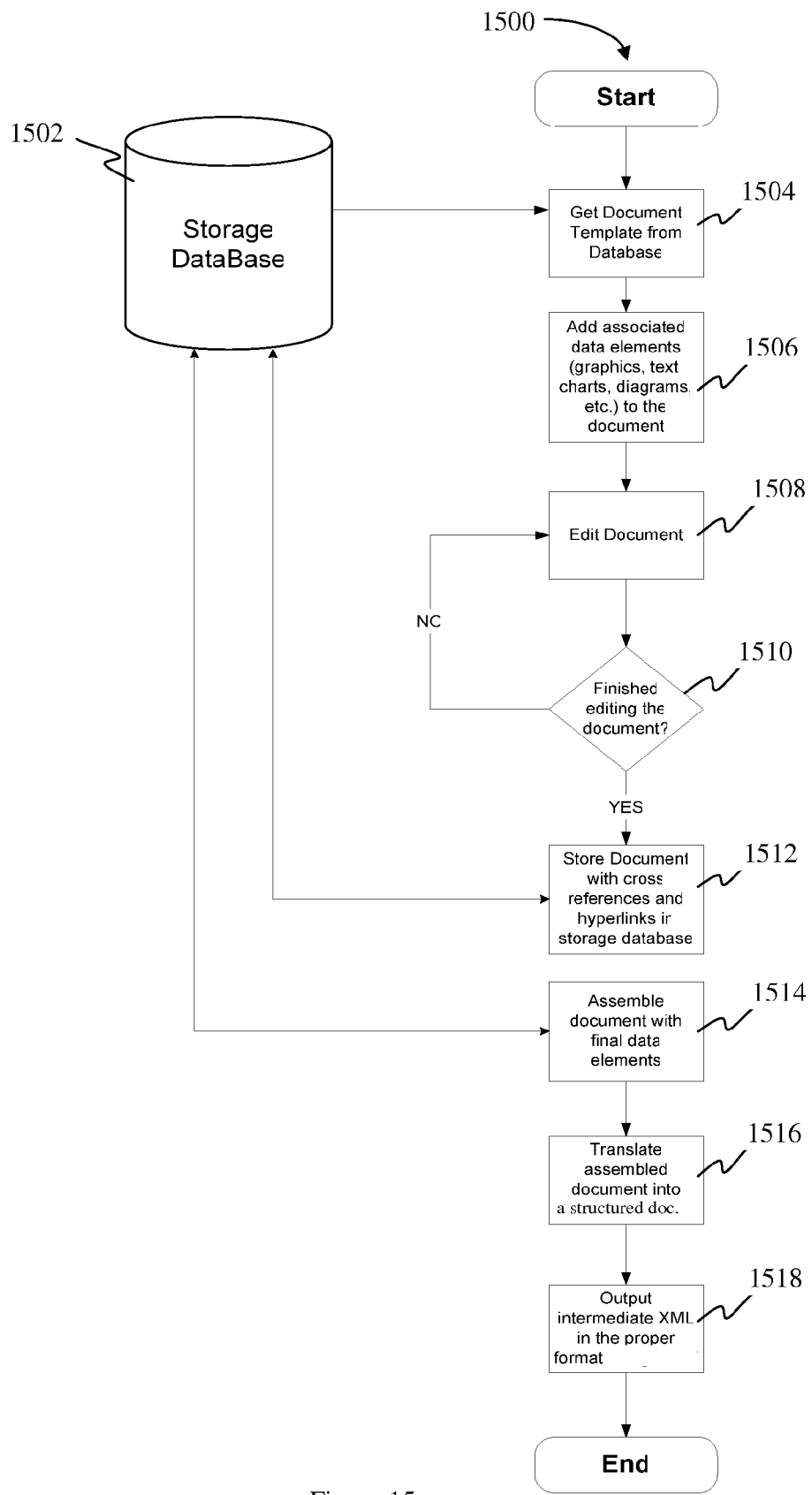
FIG. 15 illustrates a method for authoring and generating a document according to one embodiment of the invention.

FIG. 15 illustrates a method for authoring and generating a document according to one embodiment of the invention. A document template is retrieved from the storage database 1502. The associated data elements (i.e., graphics, text, charts, diagrams, etc.) defined by the document template from the storage database may be added 1506 to the compiled final document 1502. The user may edit the document 1508 by customizing data elements to conform to an industry specification or a client requirement until the document is complete 1510. The document is stored 1512 in the storage database 1502 with cross references and hyperlinks to common data elements. A compiled document is assembled 1114 with the data elements translated into a structured document format

1516. The intermediate XML formatted document is output in the format specified by the user 1518.

Figure 16:
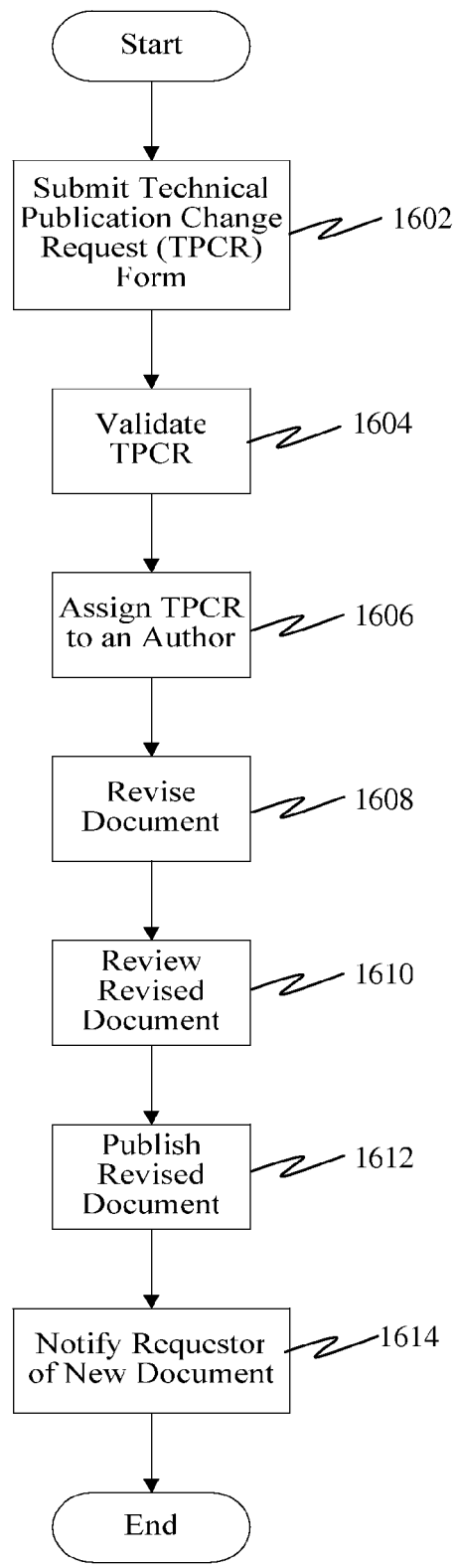
FIG. 16 illustrates a method for processing an internet-based client document change request application according to one embodiment of the invention.

FIG. 16 illustrates a method for processing an internet-based client document change request application according to one embodiment of the invention. A technical publication change request form is submitted by a client 1602. The submitted technical publication change request form is automatically sent to a reviewer for validation 1604. For example, certain fields may be required to be completed before the request can be assigned, or the submission is returned to the requester with a request for the missing information. The submitted technical publication change request is assigned to an author 1606 to revise 1608 the document. The revised document is reviewed 1610 for errors and is then sent for independent review to insure accuracy prior to being published 1612. For example, if the technical change request involves an engineering change to an aircraft, a certified aircraft engineer may review the documentation change to insure the accuracy of the revision. A response is sent to the requester that action has been taken on the submitted technical publication change request and that the updated document is available 1614.

Figure 17:
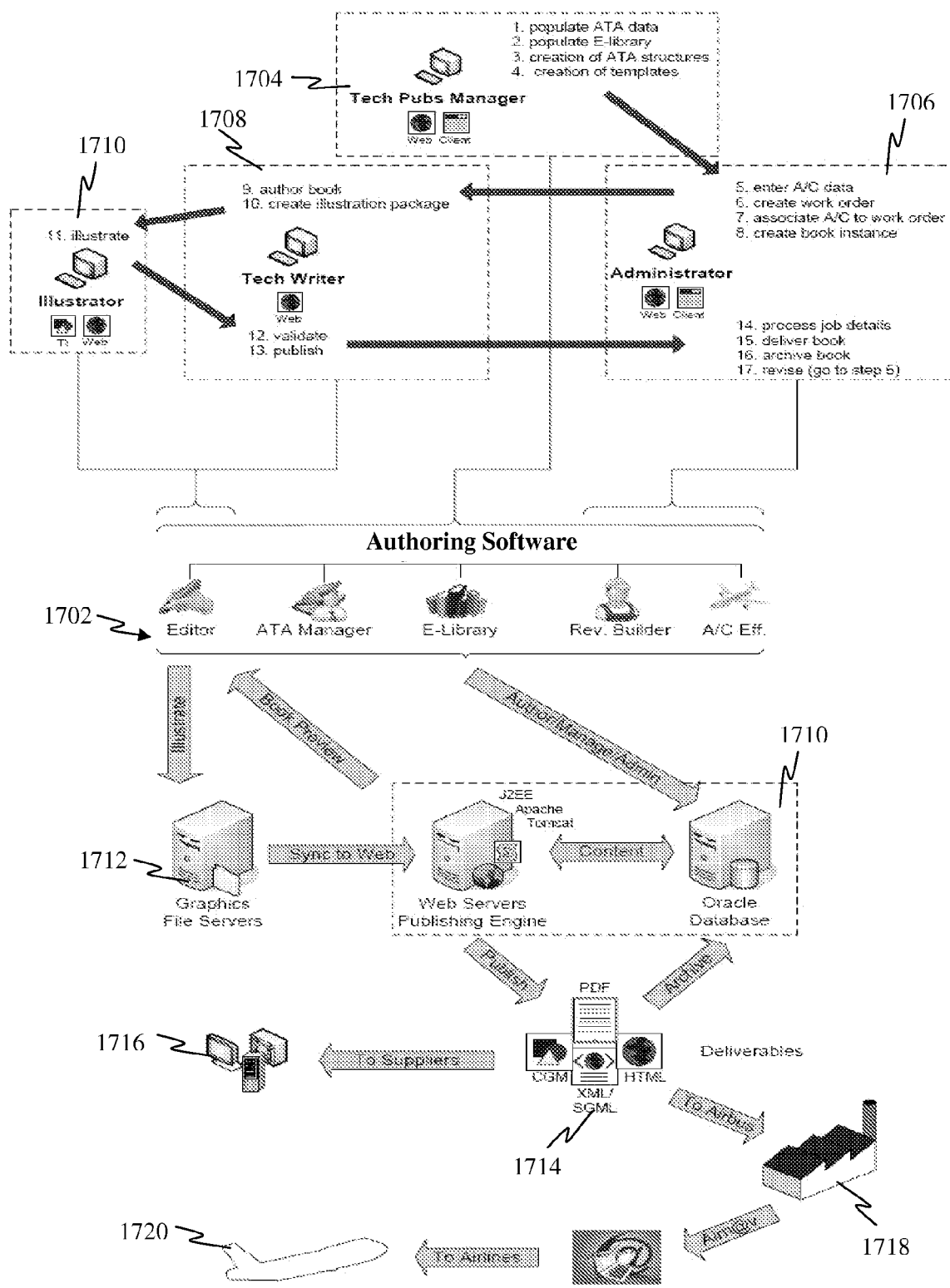
FIG. 17 is a block diagram illustrating the automated authoring and publishing software as may be implemented by the airline industry.

FIG. 17 is a block diagram illustrating the automated authoring and publishing software as may be implemented by the airline industry. The authoring and publishing software 1702 starts by (a) obtaining data corresponding to the pertinent aircraft, (b) populating electronic libraries with supporting functions, tasks, and/or data for the aircraft, (c) creating data structures specific to a particular aircraft, and (d) creating document definitions based on the data structures 1704. An administrator 1706 then defines a book by (a) entering aircraft-specific data, (b) creating a work order, (c) associating aircraft to the work order, and (d) creating a book instance 1706. An author 1708 then writes or edits the book and creates illustrations 1710. Once created, the book is validated and published. Once published 1714, the book may be distributed to suppliers 1716, manufacturers 1718, archival servers 1710 and 1712, and to airliners 1720. Such books may include maintenance, repair, and installation information for the various components of an aircraft or family of aircraft.

Another embodiment provides an apparatus comprising a machine readable medium containing instructions that, when executed, cause the machine to perform operations of loading a predefined document template. Parts of the predefined document template can then be selected or excluded from the document. Individual document elements are retrieved from a storage database. Individual document elements are inserted into the predefined document definition. Text is automatically generated and inserted into the predefined document definition. The predefined document definition and the individual document elements are stored together as a new document in the storage database. An output format for the new document is selected. The new document is then encoded as an extensible markup language file. The extensible markup language file is converted to the output format selected by the user using an extensible stylesheet language transform. The new document is then published in the output format selected.

The document authoring and generation system has several advantages over the prior art in terms of data production, distribution, modification, and usage.

Data production is improved by the automatic authoring and publishing system by using a single data source for multiple documents, the automation of effectivity management, reducing paper handling thereby improving flow time, improvement in quality, improved productivity through use of common data libraries, and/or a greater adherence to formatting, style and structure of a document.

Data distribution is improved by having more complete data sources, improved document and data delivery time, and decreased shipping costs (e.g., electronic data shipping versus paper documents/manuals).

Data modification is improved by decreasing the time needed to incorporate modifications, decreasing the costs of re-authoring or editing a document, and making automatic translation of documents (e.g., into different languages or formats) possible.

Data usage is improved by retrieval software/browsers resulting in improved access time to digital data, searching of pertinent data utilizing the intelligence of the data structure, data customization based on document definitions.

Lastly, the data revision process is also improved in terms of revision control, revision time, and automated revision markings.

What has been described is a new and improved system and method for automatically authoring and publication of documents overcoming the limitations and disadvantages inherent in the related art. Although the present invention has been described with a degree of particularity, it is understood that the present disclosure has been made by way of example. For example, the present invention is not limited to aircraft manuals but may be implemented with any other products (e.g., cars, boats, electronics, etc.) where manual are needed. Since various changes could be made in the above description without departing from the scope of the invention, it is intended that all matter contained in the above description or shown in the accompanying drawings shall be illustrative and not used in a limiting sense.

What is claimed:

1. A method of generating a customized document about a product, the method comprising:
   a) providing a user with a document manager input interface on a computer, the input interface including a definition manager module, an electronic library manager module, an automatic text generator module, a document editor module, an effectivity interface module, and a document builder module;
   b) on the computer, defining a document definition based on a plurality of predefined data elements arranged in a tree-like data structure using the definition manager module, the predefined data elements being retrieved from a parts library contained in the document builder module, wherein the document definition comprises at least one of (i) organization of sections of the customized document, (ii) maintenance codes specific to the product, and (iii) page formatting information;
   c) on the computer, creating the customized document from the document definition using the definition manager module;
   d) on the computer, storing the customized document in a relational database;
   e) on the computer, editing one or more of the predefined data elements using the document editor module by using content-specific selection menus to generate revised data elements that are stored in the relational database;
   f) on the computer, deconstructing syntax of textual data elements that are syntactically joined with linguistic rules, specifying a category in which to place a business rule, generating one or more tasks associated with the business rule, and applying the business rule to the textual data elements of the customized document using the automatic text generator module;

g) on the computer, modifying given data that is standard in particular data structures, and customizing the given data for particular applications using the electronic library manager module;

h) on the computer, establishing effectivity associations, using the effectivity interface module, for a given component of the product, and thereby defining a manner in which a change to the given component is propagated throughout the customized document;

i) in response to the user making the change to the given component via the effectivity interface module, propagating the change throughout the customized document according to the effectivity associations established by the user;

j) synthesizing text from the revised data elements according to (i) the document definition defined by the document definition module, (ii) edits made by the user via the document editor module, (iii) the business rule applied by the user via the automatic text generator module, (iv) the customized data provided by the electronic library manager module, and (v) the effectivity associations established via the effectivity interface module; and k) generating and publishing the customized document.

2. The method of claim 1, further comprising:
tracking an effectivity in the customized document to track all of the predefined data elements or the revised data elements across multiple other documents to enable filtering of content by one or more effectivity.

3. The method of claim 1, wherein the plurality of predefined data elements are selected from the group consisting of text, quantity, descriptions, procedures and graphical metadata.

4. The method of claim 1, wherein the step of editing one or more of the predefined data elements includes:
performing tasks pre-associated with the predefined data elements.

5. The method of claim 1, further comprising:
cross-referencing one of the predefined data elements or revised data elements to one or more other documents.

6. The method of claim 1, further comprising:
dynamically generating the content-specific selection menus based on a defined content type of the document definition.

7. The method of claim 1, further comprising:
previewing the customized document prior to publishing.

8. The method of claim 1, further comprising:
publishing the customized document by performing the steps of:
converting the customized document into an extensible markup language document;
forwarding the extensible markup language document to an extensible style sheet transform; and
outputting the extensible markup language document from the extensible style sheet transform as a published document.

9. The method of claim 8, further comprising:
receiving an internet-based change request to the published document; and
effecting the requested change to the published document.

10. The method of claim 1, further comprising:
providing automatic revision markings on the customized document by comparing the customized document during editing to a previously archived document on the fly.

11. An automated authoring and publishing system for generating a customized document about a product, the system comprising:

a processor coupled to an input interface;

a storage device coupled to the input interface and the processor, the storage device comprising code causing the processor to:

a) provide a user with a document manager input interface, the input interface including a definition manager module, an electronic library manager module, an automatic text generator module, a document editor module, an effectivity interface module, and a document builder module;

b) define a document definition based on a plurality of predefined data elements arranged in a tree-like data structure using the definition manager module, the predefined data elements being retrieved from a parts library contained in the document builder module, wherein the document definition comprises at least one of (i) organization of sections of the customized document, (ii) maintenance codes specific to the product, and (iii) page formatting information;

c) create the customized document from the document definition using the definition manager module;

d) store the customized document in a relational database;

e) edit one or more of the predefined data elements using the document editor module by using content-specific selection menus to generate revised data elements that are stored in the relational database;

f) deconstruct syntax of textual data elements that are syntactically joined with linguistic rules, specifying a category in which to place a business rule, generate one or more tasks associated with the business rule, and apply the business rule to the textual data elements of the customized document using the automatic text generator module;

g) modify given data that is standard in particular data structures, and customize the given data for particular applications using the electronic library manager module;

h) establish effectivity associations, using the effectivity interface module, for a given component of the product, and thereby define a manner in which a change to the given component is propagated throughout the customized document;

i) in response to the user making the change to the given component via the effectivity interface module, propagate the change throughout the customized document according to the effectivity associations established by the user;

j) synthesize text from the revised data elements according to (i) the document definition defined by the document definition module, (ii) edits made by the user via the document editor module, (iii) the business rule applied by the user via the automatic text generator module, (iv) the customized data provided by the electronic library manager module, and (v) the effectivity associations established via the effectivity interface module; and k) generate and publish the customized document.

12. The system of claim 11, wherein the processor tracks an effectivity in the customized document to track one of the predefined data elements or revised data elements across multiple other documents to enable filtering of content by one or more effectivity.

13. The system of claim 11, wherein the processor:
cross-references the predefined data elements or revised data elements to one or more other documents.

14. The system of claim 11, wherein the processor:
dynamically generates the content-specific selection menus based on a defined content type of the document definition.

15. The system of claim 11, wherein the processor:
publishes the customized document by performing the steps of:
  converting the customized document into an extensible markup language document;
  forwarding the extensible markup language document to an extensible style sheet transform; and
  outputting the extensible markup language document from the extensible style sheet transform as a published document.

16. A storage medium containing instructions for generating of a customized document about a product, which when executed by a processor, causes the processor to perform operations comprising:
  a) providing a user with a document manager input interface, the input interface including a definition manager module, a electronic library manager module, an automatic text generator module, a document editor module, an effectivity interface module, and a document builder module;
  b) defining a document definition based on a plurality of predefined data elements arranged in a tree-like data structure using the definition manager module, the predefined data elements being retrieved from a parts library contained in the document builder module, wherein the document definition comprises at least one of (i) organization of sections of the customized document, (ii) maintenance codes specific to the product, and (iii) page formatting information;
  c) creating the customized document from the document definition using the definition manager module;
  d) storing the customized document in a relational database;
  e) editing one or more of the predefined data elements using the document editor module by using content-specific selection menus to generate revised data elements that are stored in the relational database;
  f) deconstructing syntax of textual data elements that are syntactically joined with linguistic rules, specifying a category in which to place a business rule, generating one or more tasks associated with the business rule, and applying the business rule to the textual data elements of the customized document using the automatic text generator module;
  g) modifying given data that is standard in particular data structures, and customizing the given data for particular applications using the electronic library manager module;
  h) establishing effectivity associations, using the effectivity interface module, for a given component of the product, and thereby defining a manner in which a change to the given component is propagated throughout the customized document;
  i) in response to the user making the change to the given component via the effectivity interface module, propagating the change throughout the customized document according to the effectivity associations established by the user;
  j) synthesizing text from the revised data elements according to (i) the document definition defined by the document definition module, (ii) edits made by the user via the document editor module, (iii) the business rule applied by the user via the automatic text generator module, (iv) the customized data provided by the electronic library manager module, and (v) the effectivity associations established via the effectivity interface module; and
  k) generating and publishing the customized document.

17. The storage medium of claim 16, further comprising instructions which when executed by a processor, causes the processor to perform operations comprising:
  providing tasks pre-associated with the predefined data elements.

18. The storage medium of claim 16, further comprising instructions which when executed by a processor, causes the processor to perform operations comprising:
  cross-referencing at least one of the predefined data elements and the revised data elements to one or more other documents.

19. The storage medium of claim 16, further comprising instructions which when executed by a processor, causes the processor to perform operations comprising:
  dynamically generating the content-specific selection menus based on a defined content type of the document definition.

20. The storage medium of claim 16, further comprising instructions which when executed by a processor, causes the processor to perform operations comprising:
  translating the customized document from an extensible markup language file to an output format selected using an extensible style sheet language transform.

* * * * *